United States Patent [19]
Bondy et al.

[11] Patent Number: 6,071,409
[45] Date of Patent: Jun. 6, 2000

[54] PHENOLIC WASTEWATER TREATMENT WITH ETHERS FOR REMOVAL AND RECOVERY OF PHENOLICS

[75] Inventors: Frederick Bondy, New York, N.Y.; Apostol Gradinaru, Onesti Bacau, Romania; James Mason Hildreth, Wyckoff, N.J.

[73] Assignee: ABB Lummus Global Inc., Bloomfield, N.J.

[21] Appl. No.: 09/111,074

[22] Filed: Jul. 7, 1998

[51] Int. Cl.[7] .......................... B01D 11/04; C07C 39/04; C07C 39/19; C07C 37/72

[52] U.S. Cl. ........................ 210/634; 210/767; 568/716; 568/749

[58] Field of Search .................................... 568/716, 749; 210/634, 767

[56] References Cited

U.S. PATENT DOCUMENTS

4,575,568  3/1986  Yuhas, Jr. et al. ...................... 568/749

OTHER PUBLICATIONS

Croix et al., "Dense bed in a spray column. Application to the extraction of phenol from waste water," Proc. Int. Solvent Extr. Conf., vol. 1, pp. 913–926, 1974.

Croix et al., "Application of dense–bed columns. Treatment of sewages containing phenols by liquid–liquid extraction," Bull. Inform. Sci. Tech., Commis. Energ. At. (Fr.), No. 177, pp. 11–24, 1973.

Primary Examiner—Joseph McKane
Assistant Examiner—Jane C. Osswecki
Attorney, Agent, or Firm—Alix, Yale & Ristas, LLP

[57] ABSTRACT

Liquid-liquid extraction is used for the removal of phenolics from wastewater streams using an ether extractant which has a high partition coefficient and a low solubility in water such as methyl tertiary-butyl ether. The resulting phenolics-ether mixture may be separated by distillation or by the use of an aqueous solution of an alkali metal hydroxide to form a phenate in an aqueous phase and the ether in an organic phase followed by phase separation. Any ether dissolved in the wastewater is removed by distillation or the solubility of the ether in the wastewater is retarded by adding an aqueous alkali salt solution. In the distillation embodiment, an environmentally acceptable wastewater is readily obtained. In the salt treatment embodiment, the wastewater is suitable for treatment in the overall plant complex associated with the phenol/acetone plant.

7 Claims, 2 Drawing Sheets

PHENOLIC WASTEWATER TREATMENT WITH ETHERS FOR REMOVAL AND RECOVERY OF PHENOLICS

BACKGROUND OF THE INVENTION

The present invention relates to a process for treating wastewater streams containing phenolics and more specifically to the extraction of the phenolics with ethers and then the recovery of the phenolics and the recycle of the ethers.

Various methods have been used in the past to remove phenolics (phenol and cresol) from wastewater streams including chemical reaction, adsorption with resins, absorption with macromolecular an substances and liquid-liquid extraction. An example of a chemical reaction method is U.S. Pat. No. 3,843,643, dated Oct. 22, 1974, where a chemical such as hexamethylene tetramine is added to phenolic wastewater so as to react with phenol to form a phenol-hexamethylene tetramine adduct and the adduct is separated from the wastewater with subsequent decomposition of the adduct and further separation of the phenol from the hexamethylene tetramine in which the amine can be recycled either as a solid or concentrated slurry. Other chemical treatment methods for phenolic wastewater involve the use of hydroxides or carbonates of alkali metals in conjunction with chlorine gas (Japanese Patent Application 48-104,352, dated Dec. 27, 1973) or the use of monopersulfuric acid (U.S. Pat. No. 3,711,402, dated April, 1973). However, these chemical reaction methods involve cumbersome recovery and the recycle of solid chemical treating agents or slurries. Also, there may be the costly consumption of the chemical treating agents.

A process where adsorption with resins is used is Japanese Patent Application 4-346,954, dated Dec. 2, 1992, which relates to a process wherein phenols are removed from phenolic wastewater by adsorption onto styrene—divinylbenzene resins, after which the phenols are deadsorbed with a deadsorption agent and recovered. This involves the use of costly adsorption resins and the problem of disposing of them when they are spent.

The absorption technique is illustrated in German Patent Application 2,531,101, dated Jan. 22, 1976, in which phenols are removed from phenolic wastewater by absorption into macromolecular substances, namely poly-alpha-haloketones. Once again, this involves the use of costly substances and the attendant disposal problem. Also, with the adsorption and absorption there can be complex regeneration procedures.

Japanese Patent Application 49-080,029, dated Aug. 2,1974, relates to a process wherein phenols are removed from phenolic wastewater using either benzene or toluene as extracting agents with a subsequent distillation to recover either the benzene or toluene and the phenols. It is also known that cumene (isopropylbenzene) can be used commercially for the removal of phenols from phenolic wastewater. However, the extracting agents which have been used have low partition or distribution coefficients making the extraction inefficient.

SUMMARY OF THE INVENTION

A liquid-liquid extraction process is used for the removal of phenolics from wastewater streams and involves the use of extractants composed of ethers which have a high partition coefficient for the phenolics. The process further involves the separation and recovery of the phenolics and the ethers and the recycle of the ethers. The separation and recovery may involve a distillation and stripping arrangement or it may involve the use of an aqueous alkali salt solution to retard the solubility of the ether extractant in the dephenolated wastewater in conjunction with the use of an aqueous solution of an alkali metal hydroxide to convert the phenolics in the ether extractant to an alkali metal phenate solution from which the phenolics are recovered. The separation process using distillation and stripping produces an environmentally acceptable wastewater. The alternate process produces a suitable salt solution which may be subsequently crystallized, such as to a $Na_2SO_4$ hydrate, for sale to the paper industry with the equilibrium water suitable for discharge into a river or ocean.

DESCRIPTION OF THE PREFERRED EMBODIMENTS

The invention relates to the treatment of a wastewater stream which contains phenolic contaminants. Included would be wastewater streams containing phenol, cresols or mixtures of both. Just as an example, such wastewater streams might be from bisphenol A plants or phenol/acetone plants. As one specific example, the wastewater stream from a bisphenol A plant might contain on the order of 0.7% by weight (7,000 ppmw) phenolics whereas the level of phenolics in wastewater for disposal should be 10.0 ppmw or less by weight and preferably less than 1.0 ppmw. All references to percentages and parts will be by weight.

In the present invention, the wastewater stream containing the phenolics is contacted with the ether extractant. This contact can take place in any suitable equipment providing contact between the liquids and may be single stage, such as in a drum equipped for phase separation, or multistage, such as in a liquid-liquid extraction column. The invention will be described with reference to the liquid-liquid extraction column but is not limited to such a process and equipment.

Figure 1:
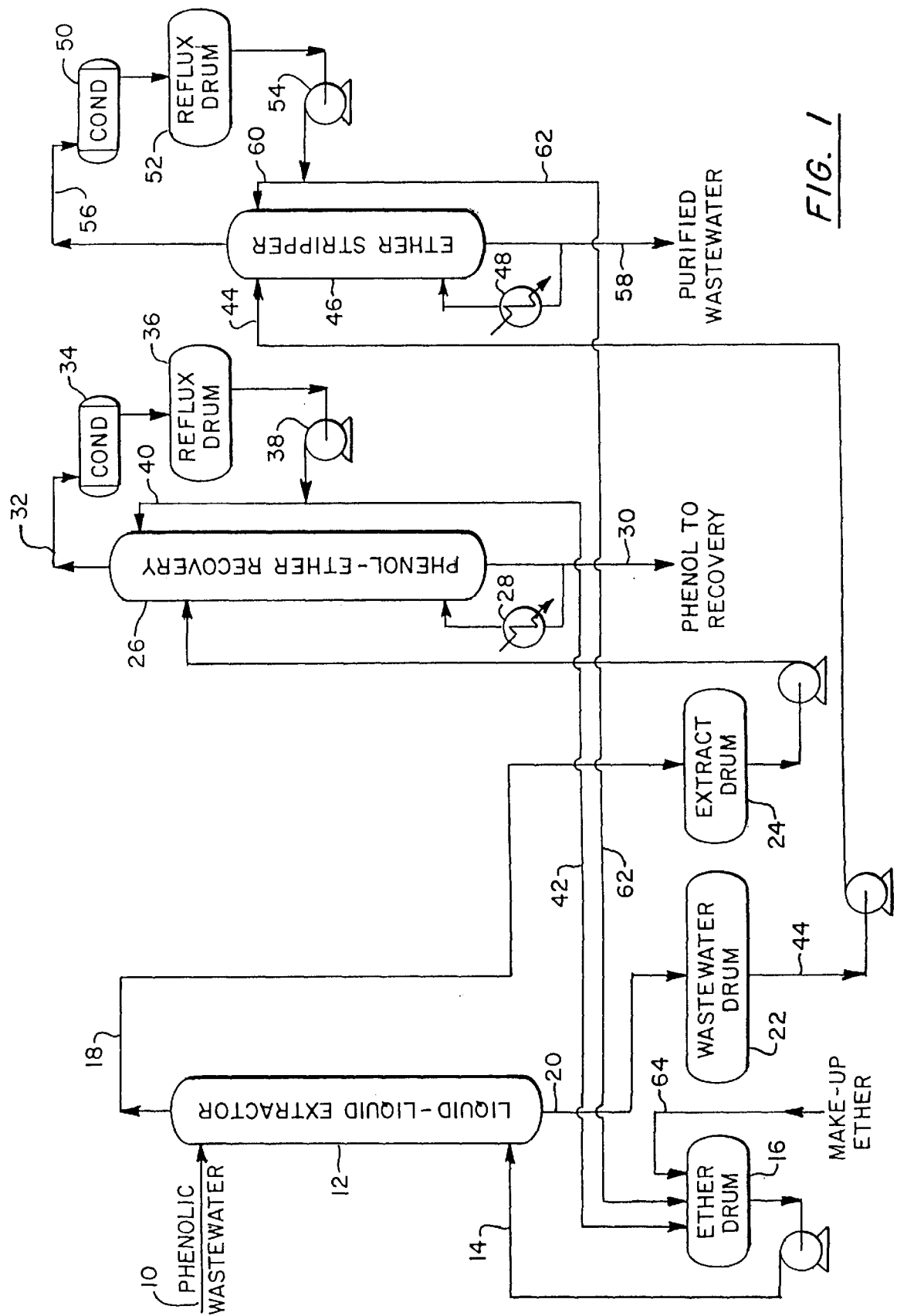
FIG. 1 is a process flow diagram of one embodiment of the invention including the use of the distillation and stripping.

As depicted in FIG. 1, the wastewater stream 10 containing the phenolics is introduced into the top of the liquid-liquid extraction column 12. Introduced into the bottom of the column 12 is the ether extractant 14 from the ether drum 16. The ethers which can be used in the extraction column 12 are those which have a high partition coefficient for the phenolics, are not very soluble in water, and are readily available and inexpensive. Examples are ethyl tertiary-amyl ether, diisopropyl ether, ethyl tertiary-butyl ether and methyl tertiary-butyl ether (MTBE). All of the examples which follow use MTBE as the preferred ether.

The ether and the wastewater flow countercurrently in the column 12 in which the ether extracts the phenolics from the wastewater. The ether which now contains the phenolics is withdrawn at 18 from the top of the column 12 whereas the wastewater now depleted in phenolics is withdrawn at 20 from the bottom of the extraction column. The extraction column 12 contains, for example, eight perforated trays and operates at a temperature of about 25° C. at atmospheric pressure. As an example, the wastewater 20 may contain about 5.2 % ether and 44 ppb phenolics and 94.8 % water. The wastewater 20 flows to the wastewater drum 22 for mixing with other streams and for treatment as will be explained hereinafter. The overhead 18 from the extraction column 12 may now contain, as an example, 95.52 % ether, 3.36 % water and 1.12 % phenolics.

The overhead 18 from the extraction column 12 flows to the extract drum 24 and is then pumped to the phenol-ether recovery column 26 which includes a reboiler 28. As an example, this column 26 may have 24 trays and have a bottoms temperature of 108° C. and an overhead temperature of 59° C. when using MTBE as the extractant. The bottoms 30 from the column 26 contains about 55.7 % water, 44.2 % phenolics and about 188 ppm MTBE. This water-phenolics stream 30 may be processed in any way desired such as recycling to the source plant such as the bisphenol A plant. In this example, the overhead 32 from the column 26 is basically an MTBE stream and has a composition of about 2 % water and 98 % MTBE with only negligible phenolics. The overhead 32 is condensed at 34 and passed to the reflux drum 36. From the reflux drum 36, the MTBE stream is pumped at 38 with a portion, perhaps 67% returning to the column 26 as reflux in line 40 and the remainder being recycled in line 42 to the ether drum 16.

The wastewater 44 from the wastewater drum 22 is pumped to the ether stripper 46 which has a reboiler 48, an overhead condenser 50, a reflux drum 52 and a reflux pump 54. As previously indicated, the wastewater feed 44 to the column 46 contains about 94.8 % water, 5.2 % MTBE and perhaps about 44 ppb phenolics. The column 46 has 20 trays, an overhead temperature of 63° C., a bottoms temperature of 1 05° C. and operates at essentially atmospheric pressure. The composition of the overhead 56 is about 94.8% MTBE and 5.2% water while the composition of the bottoms 58 is essentially 100% water with perhaps 13.8 ppm MTBE and 0.05 ppm phenolics. About 67% of the overhead is reflux at 60 with the remainder being recycled in line 62 to the ether drum 16. Any make-up MTBE which is required is added at 64.

Figure 2:
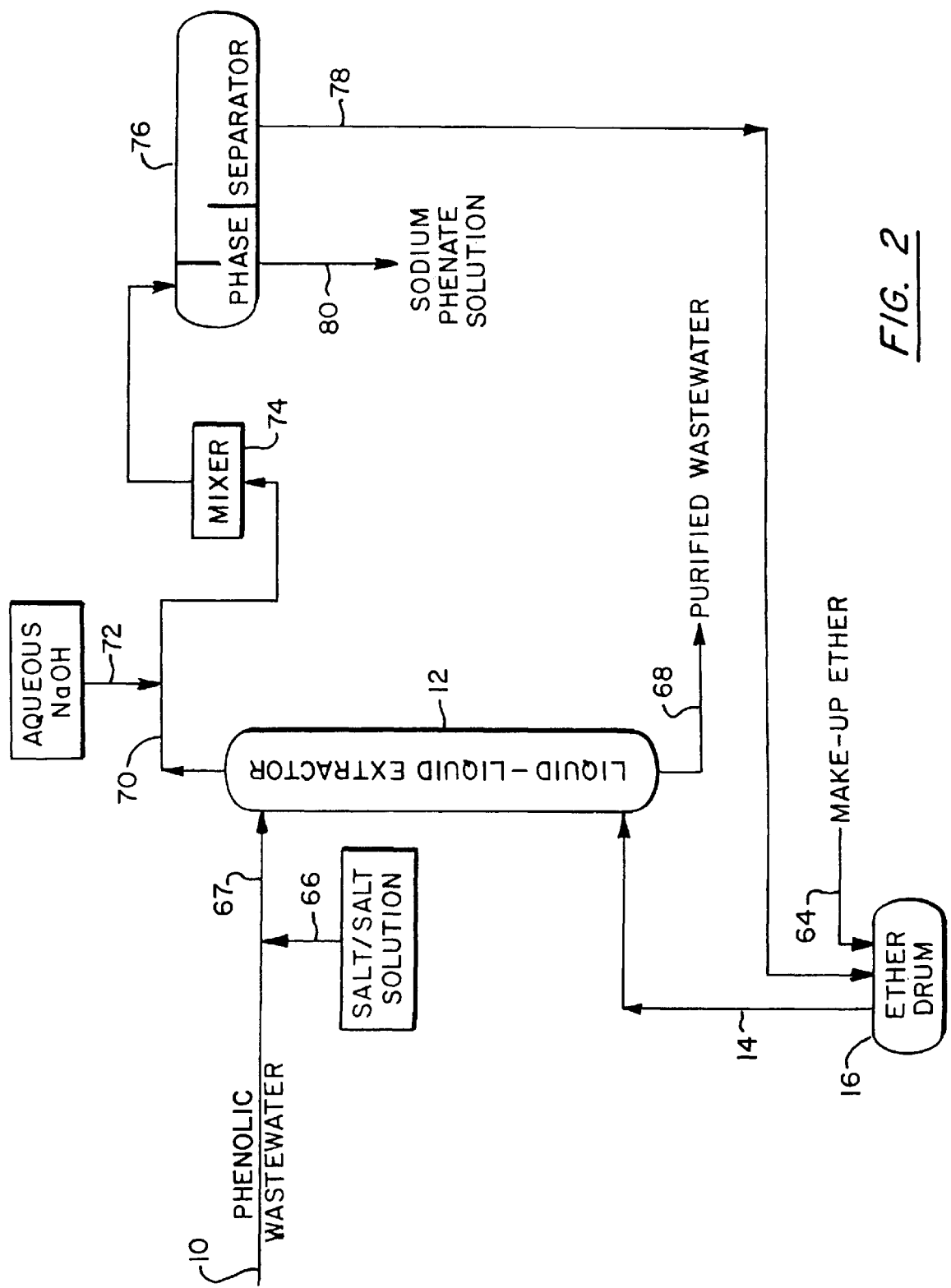
FIG. 2 is a simplified process flow diagram showing an alternate embodiment of the invention using an aqueous alkali salt and then an aqueous alkali metal hydroxide for the recovery of the ethers and phenolics.

Another embodiment of the invention is shown in the process flow diagram of FIG. 2, wherein all equipment and streams are at ambient temperature and essentially atmospheric pressure. In this embodiment, a liquid-liquid extraction column 12 is still used with the same ether extraction method including the ether feed line 14, the ether drum 16 and the make-up of ether feed 64. However, since there is a significant amount of ether that is soluble in the wastewater in the FIG. 1 embodiment, on the order of 5.2% ether as cited earlier, this FIG. 2 embodiment uses a procedure to retard the solubility of the ether extractant in the dephenolated wastewater. This is done by adding an aqueous alkali salt solution 66 to the phenolic wastewater feed 10 to form stream 67. The addition of salt or salt solution also enhances the ease of the liquid-liquid extraction step by increasing the density difference between the extract and raffinate phases. The salt or salt solution 66 may be any alkali salt which will retard the solubility of the ether in water thereby significantly reducing downstream recovery equipment, chemical consumption and concomitant costs. The salt lowers the solubility of the ether because the salt is a third component whose solubility is greater than the solubility of the ether in water. Examples are sodium sulfate and sodium carbonate and the amount that is added is in the range of 10–18 wt., based on the phenolic wastewater feed. This technique will lower the concentration of the ether in the dephenolated wastewater 68 to between 0.1 to 0.01%. The amount of ether is down to a level such that an ether stripper such as 46 of the FIG. 1 embodiment is unnecessary to purify the dephenolated wastewater 68 and to recover the ether. The salt can be crystallized to a $Na_2SO_4$ hydrate for sale to the paper industry leaving equilibrium water suitable for discharge into a river or ocean.

The addition of the salt discussed above may be unnecessary for certain phenolic wastewaters such as from a phenol/acetone plant where sufficient alkali salt may already be present in the wastewater.

The overhead 70 from the column 12 of FIG. 2 containing approximately the same quantities and components as in the FIG. 1 embodiment is treated with an aqueous solution of a hydroxide of an alkali metal 72, such as NaOH or KOH, which reacts with the phenolics to form an aqueous alkali metal phenate solution such as an aqueous sodium phenate solution. These reactants are mixed at 74 to promote the reaction which forms two phases, an aqueous phase containing the phenate and an organic phase containing the ether. These two phases are separated in the phase separator 76. The organic phase 78 containing the nearly pure ether is recycled to the ether drum 16. The aqueous phase 80 containing the phenate is processed as desired to recover the phenol or may be directly recycled to a phenol plant. Stream 80 can be sent to the neutralizer in the phenol plant. Any residual MTBE would ultimately be distilled in the existing phenol purification columns.

The embodiment shown in FIG. 2 can be practiced in a number of different ways as regards the salt addition. For example, for sodium sulfate added to the phenolic wastewater so as to achieve a salt content in the phenolic wastewater feed to the liquid-liquid extractor ranging from about 10–18%, dry sodium sulfate or a prepared aqueous solution of sodium sulfate having a concentration of 18–19% at about 10–25° C. Also, a typical aqueous sodium sulfate purge from the neutralization section of a phenol plant having a sodium sulfate concentration of about 20–22% at about 40–50° C. can be used.

A typical material balance, employing the stream numbers given in FIG. 2, while using ethyl tertiary-amyl ether, dry sodium sulfate and 5000 kg/hr of a phenolic water containing 10,000 ppm phenol, is given below. In this example, 600 kg/hr of dry sodium sulfate are added to the 5000 kg/hr phenolic water, so as to form a 14.0% ratio, based on the phenolic water itself.

Material Balance for Embodiment No. 2, Kg/h[1,2]

| Component | Mol. Wt. | Stream No. 10 Phenolic Waste Water | 66 Dry Salt | 67 Extractor Feed | 70 Extractor Overhead | 68 Purified (Dephenolated) Wastewater | 72 20% NaOH | 80 Sodium Phenate Solution | 78 Recycle Ether | 64 Make-up Ether | 14 Total Ether to Extractor |
|---|---|---|---|---|---|---|---|---|---|---|---|
| Phenol | 94.11 | 50.00 | | 50.00 | 50.00 | (0.02) | | | [3] | | [3] |
| Water | 18.02 | 4950.00 | | 4950.00 | [3] | 4950.00 | 97.88 | 107.45 | [3] | | [3] |
| Sodium Sulfate | 142.04 | | 700.00 | 700.00 | [3] | 700.00 | | | [3] | | [3] |
| Ethyl tertiary-amyl Ether | 116.23 | | | | 2496.05 | (700) 3.95 | | | 2496.05 | 3.95 | 2500.00 |

-continued

Material Balance for Embodiment No. 2, Kg/h[1,2]

| Component | Mol. Wt. | 10 Phenolic Waste Water | 66 Dry Salt | 67 Extractor Feed | 70 Extractor Overhead | 68 Purified (Dephenolated) Wastewater | 72 20% NaOH | 80 Sodium Phenate Solution | 78 Recycle Ether | 64 Make-up Ether | 14 Total Ether to Extractor |
|---|---|---|---|---|---|---|---|---|---|---|---|
| Sodium Hydroxide | 40.00 | | | | | | 24.47[4] | 3.19 | | | |
| Sodium Phenate | 116.08 | | | | | | | 61.74 | | | |
| TOTAL | — | 5000.00 | 700.00 | 5700.00 | 2546.05 | 5653.95 | 122.35 | 172.38 | 2496.05 | 3.95 | 2500.00 |

[1] Numbers in parentheses ( ) are concentrations in ppm.
[2] All streams can be assumed to be at 20–25° C.
[3] The solubility of water in ethyl tertiary-amyl ether is 0.2% at 20° C., but has not been taken into account for stream numbers 70, 78 and 14, for simplicity. The same is applicable for any sodium sulfate contained in this dissolved water.
[4] NaOH added in 15% excess of theoretical (stoichiometric) to insure conversion of phenol to sodium phenate.

What is claimed is:

1. A process for removing phenolics from a wastewater stream comprising the steps of:
   a. contacting said wastewater stream containing said phenolics with an alkyl tertiary amyl ether extractant and an aqueous alkali salt solution in a liquid-liquid contactor to produce a phenolics-ether mixture;
   b. adding an aqueous solution of an alkali metal hydroxide to said phenolics-ether mixture whereby two phases are produced comprising an aqueous alkali metal phenate phase and an organic phase containing said ether;
   c. separating said two phases to recover an aqueous phenate phase and an organic ether phase; and
   d. recycling said separated organic ether phase to said liquid-liquid extractor.

2. A process as recited in claim 1 wherein said alkyl tertiary amyl ether extractant is ethyl tertiary amyl ether.

3. A process as recited in claim 1 wherein said alkali salt is sodium sulfate and said alkali metal hydroxide is sodium hydroxide.

4. A process for removing phenolics from a wastewater stream containing phenolics and containing an aqueous alkali salt comprising the steps of:
   a. contacting said wastewater stream containing said phenolics and said aqueous alkali salt with an ether extractant in a liquid-liquid contactor to produce a phenolics-ether mixture;
   b. adding an aqueous solution of an alkali metal hydroxide to said phenolics-ether mixture whereby two phases are produced comprising an aqueous alkali metal phenate phase and an organic phase containing said ether;
   c. separating said two phases to recover an aqueous phenate phase and an organic ether phase; and
   d. recycling said separated organic ether phase to said liquid-liquid extractor.

5. A process as recited in claim 4 wherein said ether extractant is an alkyl tertiary amyl ether.

6. A process as recited in claim 5 wherein said alkyl tertiary amyl ether is ethyl tertiary amyl ether.

7. A process as recited in claim 4 wherein said alkali metal salt is sodium sulfate and said alkali metal hydroxide is sodium hydroxide.

* * * * *